UNITED STATES PATENT OFFICE 2,553,093

AMINOALKYLETHANESULFONAMIDE

Robert Michel Jacob, Villeneuve-le-Roi, and Gilbert Bo and Jacques Georges Robert, Paris, France, assignors to Société des Usines Chimiques Rhone-Poulenc, Paris, France, a corporation of France No Drawing. Application November 1, 1948, Serial No. 57,826. In France November 4, 1947

1 Claim. (Cl. 260—556)

The present invention relates to the preparation of new sulphonamide derivatives and particularly to the preparation of sulphonamide derivatives of the general Formula I:

$$R-SO_2-N\begin{cases} A-N(R_1)_2 \\ A_1-N(R_2)_2 \end{cases} \quad I$$

In this formula, R represents a radical selected from the class consisting of alkyl radicals containing less than 5 carbon atoms, aryl radicles and aryl radicles substituted by methyl, by chlorine, by amino and by acetylamino, A and $A_1$ each represent the same or different divalent hydrocarbon groups selected from the class consisting of straight and branched chain aliphatic groups of not more than 5 carbon atoms and aralkyl groups; and $R_1$ and $R_2$ each represent the same or different groups selected from the class consisting of methyl and ethyl radicals and radicals forming with the adjacent nitrogen atom heterocyclic radicals e. g. piperidino or morpholino radicals.

According to one form of the invention compounds of general Formula I are prepared by condensation of a sulpho-halide, $R-SO_2X$, (where X=halogen) with a secondary amine of the formula:

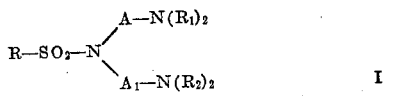

In another form of the invention compounds of general Formula I are prepared by condensation of a dialkylaminoalkyl or aralkyl halide, $$X-A_1-N(R_2)_2$$

with a sodium derivative of a monosubstituted sulphonamide $R-SO_2-NH-A-N(R_1)_2$. This monosubstituted sulphonamide can be obtained either by the action of the sulphohalide $R-SO_2X$ on the primary amine $NH_2-A-N(R_1)_2$, or by the condensation of the sodium derivative of the sulphonamide $R-SO_2NH_2$ with the halogenated derivative $X-A-N(R_1)_2$. The sodium derivatives may be prepared by the action of sodamide.

In yet another form of the invention, compounds of general Formula I wherein A is identical to $A_1$ and $R_1$ is identical to $R_2$ are prepared by condensing a sulphonamide $R-SO_2NH_2$, which may be in the form of its alkali metal derivative, with two molecules of a dialkylaminoalkyl halide $X-A-N(R_1)_2$, in the presence of an acid binding agent such as sodamide.

The compounds thus obtained have in varying degrees interesting physiological properties, and in particular they have been found to be very effective in treating states of traumatic or haemorrphagic shock. In particular bis(3-diethylamino - 1 - propyl)N.N.ethane sulphonamide, which forms the subject of Examples I, XIV and XXIV which follow, has up to the present been found the most active of the derivatives prepared and consequently constitutes one of the preferred products of the invention.

The following examples illustrate the invention but are not to be regarded as limiting it in any way:

Example I 25 g. of di(3-diethylamino-1-propyl) amine are dissolved in 200 cc. of ether. The mixture is cooled to $-10°$ C. and a solution of 13 g. of ethane sulphochloride in 100 cc. of ether are poured in over a period of ½ hour, the temperature being maintained at between $-10$ and $-5°$ C. A white precipitate of the hydrochloride of bis(3-diethylamino-1-propyl)N.N. ethane sulphonamide is formed. The product is agitated for a further hour at $-10°$ C. to $-5°$ C., and the temperature is then allowed to rise to $+10°$ C. The hydrochloride is then dissolved by adding 50 cc. of water, whereafter it is made alkaline with 20 cc. of caustic soda at 36° Bé. in order to liberate the base. The ethereal layer is separated and dried over sodium sulphate. The ether is driven off and the product is rectified; the bis(3-diethylamino-1-propyl)N.N. ethane sulphonamide distils at 169° C. under 0.5 mm. of mercury. It gives a dipicrate which melts at 148° C. (instantaneous melting point on the Maquenne block).

Example II

By following the procedure described in Example I but starting with p-chlorobenzenesulphochloride (melting point, 53° C.) and with di (3-diethylamino-1-propyl) amine, bis(3-diethylamino - 1 - propyl)N.N. p-chlorobenzenesulphonamide is obtained, which boils at from 211 to 212° C. under 0.6 mm. of mercury.

Example III

By reacting ethane sulphochloride with di(2-diethylamino-1-ethyl) amine under the conditions of Example I, bis(2-diethylamino-1-ethyl) - N.N. ethanesulphonamide is obtained, which is a colourless oil having a boiling point of 155° C. under 0.9 mm. of mercury.

Example IV 48 g. of p-acetylaminobenzenesulphochloride having a water content of 45.7% are added in small quantities with stirring to a concentrated aqueous solution containing 46 g. of di(3-diethylamino-1-propyl) amine, the temperature being allowed to rise toward 40° C.; the operation is terminated by heating for ¼ hour at 50° C.; the mixture is left to stand for one night; a product crystallizes out from which the moisture is mechanically extracted. It is recrystallized from 60% aqueous acetone yielding 23 g. of hydrated bis(3-diethylamino - 1 - propyl) N.N. p-acetylaminobenzenesulphonamide having a melting point (determined by the capillary method) of 93° C.

Example V

An ethereal solution of 30 g. of n-propanesulphobromide is run drop by drop with stirring into an ethereal solution of 78 g. of di(3-diethylamino-1-propyl) amine, the temperature being maintained at about 15-20° C. The products formed are extracted with dilute sulphuric acid. Upon addition of an excess of soda lye to these acid solutions, an oil separates. It is decanted and extracted with ether. After the solvent has been driven off, 39.3 g. of bis(3-diethylamino-1-propyl) N.N. n-propanesulphonamide are separated by distillation under reduced pressure, the boiling point of which under 0.25 mm. of mercury is 162-163° C. and the dipicrate of which has a melting point (determined by the capillary method) of 147.5° C.

Example VI

By following the procedure described in Example V, but replacing the n-propanesulphobromide by the molecular equivalent of methanesulphochloride and replacing the di(3-diethylamino-1-propyl) amine by di(2-diethylamino-1-ethyl) amine, bis(2-diethylamino-1-ethyl) N.N. methanesulphonamide is obtained, which has a boiling point of 147° C. under 0.8 mm. of mercury.

Example VII

By proceeding as described in Example V, but starting with ethanesulphochloride and with di(3-dimethylamino-1-propyl) amine, bis(3-dimethylamino-1-propyl) N.N. ethanesulphonamide is obtained, which distils at 150° C. under 0.6 mm. of mercury. Its dipicrate melts at 169-170° C. on the Maquenne block.

Example VIII

By proceeding as described in Example V, but starting with benzenesulphochloride and with di(3-dimethylamino-1-propyl) amine, bis(3-dimethylamino - 1 - propyl) N.N. benzenesulphonamide is obtained, which distils at 161° C. under 0.2 mm. of mercury.

Example IX

By proceeding as described in Example V, but replacing n-propanesulphobromide by isopropanesulphobromide, bis(3 - diethylamino-1-propyl) N.N. isopropane-sulphonamide is obtained, which distils at 174-175° C. under 1.3 mm. of mercury. Its dipicrate melts at 164° C. (as determined by the capillary method).

Example X

By proceeding as described in Example V, but starting with ethanesulphochloride and with di(4-diethylamino-1-butyl) amine, bis(4-dimethylamino-1-butyl) N.N. ethanesulphonamide is obtained, which distils at 177-180° C. under 0.55 mm. of mercury, and the dipicrate of which melts at 131-132° C. (melting point on the Maquenne block).

Example XI

By proceeding as in Example V, but starting with ethanesulphochloride and with di(3-piperidino-1-propyl) amine, bis(3 - piperidino-1-propyl) N.N. ethanesulphonamide is obtained which distils at 198° C. under 0.3 mm. of mercury, and the hydrochloride of which melts at 215-216° C. (Maquenne block).

Example XII

By proceeding as described in Example V, but replacing the di(3-diethylamino-1-propyl) amine by di(4-diethylamino-1-butyl) amine, bis(4-diethylamino-1-butyl) N.N. propanesulphonamide is obtained, which distils at 174-175.5° C. under 0.45 mm. of mercury.

Example XIII

By proceeding as in Example V, but starting with ethanesulphochloride and di(5-diethylamino-1-pentyl) amine, bis(5 - diethylamino-1-pentyl) N.N. ethanesulphonamide is obtained, which distils at 164-165.5° C. under 0.3 mm. of mercury and the picrate of which melts at 91-92° C. (capillary method).

Example XIV 10 g. of ethanesulphochloride are poured drop by drop into a well-stirred solution of 10 g. of 3-diethylamino-1-amino propane. The mixture is cooled so as to maintain the temperature at about 10-20° C. during the addition. The hydrochloride of 3-diethylamino-1-ethanesulphonamido propane is precipitated. It is extracted with a minimum of water and the necessary quantity of concentrated caustic soda is added to form the base. The solution is then extracted with ether, dried over sodium sulphate and the solvent is evaporated, whereafter the product is distilled under reduced pressure. 11 g. of an oil having a boiling point of 142° C. under 0.3 mm. of mercury are obtained. This oil is poured drop by drop into an agitated suspension of 2.5 g. of sodamide at a concentration of 90% in 60 cc. of anhydrous toluene. The reaction is exothermic, and is ended by heating to 60° C. for 1 hour. The product is allowed to cool, 8.2 g. of 3-diethylamino-1-chloropropane are added and the mixture is raised to boiling point over a space of 1 hour. It is maintained at boiling point for 3 hours and then allowed to cool. The toluene solution is extracted with dilute sulphuric acid, the base is precipitated by making the solution alkaline with caustic soda and is then extracted with ether. After drying over sodium sulphate, the ether is evaporated and the product is distilled, yielding 7.7 g. of bis(3-diethylamino-1-propyl) N.N. ethanesulphonamide, boiling at 192° C. under 1.6 mm. of mercury. The dipicrate melts at 148° C. and a mixture of this product and the dipicrate of Example I shows no depression of melting point.

Example XV

By proceeding as described in Example XIV, but starting with p-chlorobenzenesulphochloride and with 3-diethylamino-1-amino propane (3-diethylamino-1-propyl) N. p-chlorobenzenesulphonamide is obtained, which is an oil boiling at 189-190° C. under 0.4 mm. of mercury. By the action of sodamide and 3-diethylamino-1-chloropropane, this substance is converted into bis(3- diethylamino-1-propyl) N.N. p-chlorobenzenesulphonamide as described in Example II.

Example XVI

By proceeding as described in Example XIV, but starting with p-diethylaminomethylbenzylamine and ethanesulphochloride, a colourless oil boiling at 200° C. under 0.9 mm. of mercury is obtained, which is p-diethylaminomethylbenzyl-N-ethanesulphonamide. By reacting this sulphonamide with sodiamide and 3-diethylamino-1-chloro-propane under the conditions previously described, p-diethylaminomethylbenzyl-N(3-diethylamino-1-propyl) N. ethane-sulphonamide is obtained, which is a viscous oil boiling at 211–212° C. under 0.9 mm. of mercury.

Example XVII

A solution of 39.2 g. of benzenesulphochloride in 100 cc. of ether is added drop by drop, with stirring, to a solution of 63.5 g. of 3-diethylamino propylamine in 250 cc. of ether, the temperature being maintained at about 15° C. The basic products are extracted with dilute hydrochloric acid. On making the solutions alkaline, white crystals are precipitated, which are dried over sulphuric acid under reduced pressure. In this way, 30 g. of (3-diethylamino-1-propyl) N. benzenesulphonamide are obtained, the melting point (Maquenne block) of which is 67–68° C. (The melting point of the pure product is 72° C.). These 50 g. of sulphonamide are introduced into a mixture of 9 g. of sodamide and 200 cc. of anhydrous toluene, and the mixture is heated for 2 hours at 60° C. After cooling to room temperature, 27.6 g. of 3-diethylamino-1-chloro-propane are added. The temperature is then raised to boiling point for 1½ hours. After cooling, the basic products formed are extracted with dilute sulphuric acid. Excess of soda lye is then added and an oil separates which is decanted and extracted with ether. After the solvent has been driven off, there remains a yellow oil which, upon fractionation under reduced pressure, gives 49.2 g. of bis(3-diethylamino-1-propyl) N.N. benzenesulphonamide having a boiling point of 197–202° C. under 0.7 mm. of mercury.

Example XVIII

By proceeding as described in Example XVII, but replacing the benzenesulphochloride by the molecular equivalent of methane-sulphochloride, bis(3-diethylamino-1-propyl) N.N. methanesulphonamide is prepared, which boils at 166–167° C. under 0.7 mm. of mercury, and the dipicrate of which melts (Maquenne block) at 110° C.

Example XIX

By proceeding as described in Example XVII, but replacing the benzene sulphochloride by the molecular equivalent of n-butanesulphochloride, bis(3-diethylamino-1-propyl) N.N. n-butanesulphonamide is prepared, the boiling point of which under 0.6 mm. of mercury is 176.5–177° C.

Example XX 10 g. of ethanesulphochloride are poured drop by drop into a well-stirred ethereal solution of 9 g. of 2-diethylamino-1-amino ethane. The mixture is cooled so as to maintain the temperature at about 10–20° C. during the addition. The hydrochloride of 2-diethylamino-1-ethanesulphonamido-ethane precipitates. It is extracted with a minimum of water, the necessary quantity of concentrated caustic soda is added to precipitate the base and the base is extracted with ether, the ether extract is dried over sodium sulphate, the solvent is evaporated and the product is distilled under reduced pressure. (2-diethylamino-1-ethyl) N. ethanesulphonamide is obtained in the form of oil, which distils at 131–132.5° C. under 1.0 mm. of mercury.

This oil is then introduced drop by drop into a stirred suspension of 2.5 g. of sodamide at a concentration of 90% in 60 cc. of anhydrous toluene. The reaction is exothermic and is ended by heating to 60° C. for one hour. The product is allowed to cool, 8.2 g. of 3-diethylamino-1-chloro-propane are added, the mixture is brought to boiling point in the space of 1 hour and the temperature is maintained at boiling point for 3 hours. The mixture is allowed to cool, the toluene solution is extracted with dilute sulphuric acid, the base is precipitated by addition of caustic soda and the base is then extracted with ether. After drying over sodium sulphate, the ether is evaporated from the extract and the product is distilled. In this way, (3-diethylamino-1-propyl) N. (2'-diethylamino-1'-ethyl) N. ethanesulphonamide is obtained, which distils at 158–160° C. under 0.8 mm. of mercury. Its dipicrate melts at 115–116° C. capillary method).

Example XXI

By proceeding as described in Example XX, (3'-diethylamino-1'-propyl) N. ethanesulphonamide, as already described in Example XIV (Boiling point 142° C. under 0.3 mm.) is first prepared. By reacting this monosubstituted sulphonamide with 3-dimethylamino-1-chloro-propane, (3-diethylamino-1-propyl) N. (3'-dimethylamino-1'-propyl) N. ethanesulphonamide is obtained, which distils at 156–259° C. under 0.7 mm. of mercury. Its dipicrate melts at 194–195° C. (Maquenne block).

Example XXII

By proceeding as in Example XX, but starting with ethanesulphochloride and with N-N-dimethylethylenediamine, (2-dimethylamino-1-ethyl) N. ethanesulphonamide is first prepared. This is reacted with β-dimethylaminochloroethane to give bis(2-dimethylamino-1-ethyl) N. ethanesulphonamide, which distils at 133–136° C. under 1.3 mm. of mercury.

Example XXIII

By proceeding as described in Example XX, but starting with ethanesulphochloride and 3-diethylamino-2:2-dimethyl-1-amino-propane, and then reacting the 3-diethylamino-2:2-dimethyl-1-chloro-propane, bis(3-diethylamino-2,2-dimethyl-1-propyl) N.N. ethanesulphonamide is prepared, which distils at 181–183° C. under 0.65 mm. of mercury.

Example XXIV 25 g. of ethanesulphonamide having a melting point of 57° C. (determined by the capillary method) are added with stirring to a suspension of 10.5 g. of sodamide at a concentration of 90% in 250 cc. of anhydrous toluene. The temperature is raised for 1 hour to 80° C. After cooling to room temperature, 36 g. of 3-diethylamino-1-chloro propane are added, whereafter the mixture is heated for 5 hours to boiling point under reflux. The mixture is cooled to room temperature and 10.5 g. of sodamide at a concentration of 90% in toluene are added. The temperature is then again raised for one hour to 80° C. and then cooled to room temperature, 39 g. of 3-diethylamino-1-chloro propane are added and the mixture is brought to the boil under reflux for 5 hours. After cooling, the basic products formed are extracted with dilute sulphuric acid. After the addition of an excess of soda lye to these acid solutions, an oil separates and this is decanted and extracted with ether. When the solvent has been driven off from the extracts, 82 g. of a yellow oil remain, which upon fractionation under reduced pressure, yield 50 g. of bis(3-diethylamino-1-propyl) N.N. ethanesulphonamide identical to that described in Examples I and XIV.

Example XXV 43 g. of p-toluenesulphonamide are added with stirring to a suspension of 12 g. of sodamide at a concentration of 90% in 550 cc. of anhydrous toluene. The mixture is heated for one hour to 80° C. After cooling to room temperature, 41 g. of 3-diethylamino-1-chloro-propane are added, which is followed by heating to boiling point under reflux for 5 hours. The solution is cooled to room temperature and 12 g. of sodamide at a concentration of 90% in toluene are added. The mixture is heated for 1 hour at 80° C., and then cooled to room temperature, 41 g. of 3-diethylamino-1-chloro-propane is then added and the mixture is brought to the boil under reflux for 5 hours. After cooling, the basic products formed are extracted with dilute sulphuric acid. Upon the addition of an excess of soda lye to these acid solutions, an oil separates and this is decanted and extracted with ether. After the solvent has been driven off from the extracts, an oil is obtained which, upon fractionation under reduced pressure, yields 82 g. of bis(3-diethylamino-1-propyl) N.N. p-toluenesulphonamide, which distils at 226° C. under 1 mm. of mercury.

Example XXVI

By proceeding as in Example XXV, but starting with benzenesulphonamide instead of p-toluenesulphonamide, bis(3-diethylamino-1-propyl) N.N. benzenesulphonamide, as already described in Example XVII is obtained.

We claim:

Bis-(3-diethylamino-1-propyl) N.N - ethanesulphonamide.

ROBERT MICHEL JACOB.
GILBERT BO.
JACQUES GEORGES ROBERT.

REFERENCES CITED

The following references are of record in the file of this patent:

UNITED STATES PATENTS

| Number | Name | Date |
|---|---|---|
| 2,361,188 | Fox | Oct. 24, 1944 |

FOREIGN PATENTS

| Number | Country | Date |
|---|---|---|
| 848,001 | France | July 17, 1939 |
| 872,967 | France | Mar. 2, 1942 |
| 538,354 | Great Britain | July 31, 1945 |

OTHER REFERENCES

Whitmore et al., J. Am. Chem. Soc., vol. 66 (1944), pp. 726, 727, 730 and 731.